(No Model.)
C. H. ROCKWOOD.
SCAFFOLD BRACKET.
No. 316,573. Patented Apr. 28, 1885.
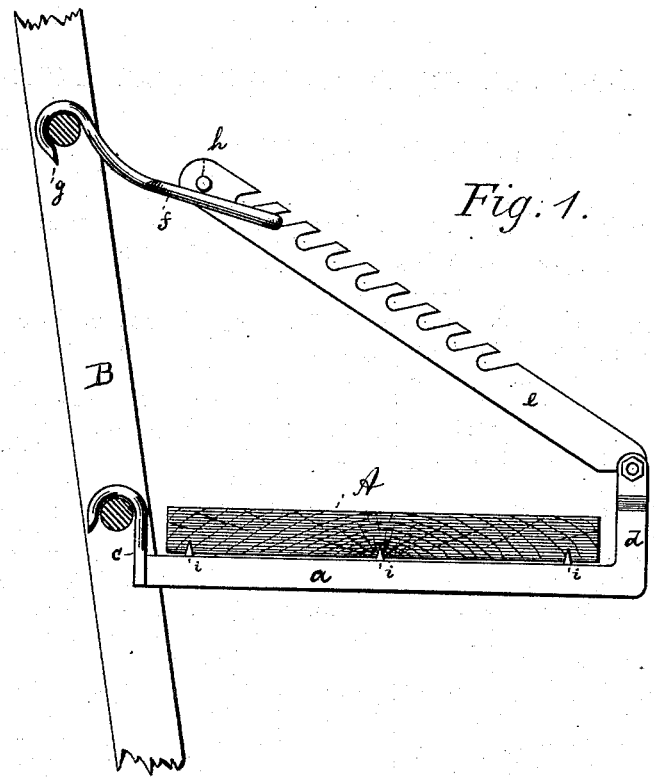
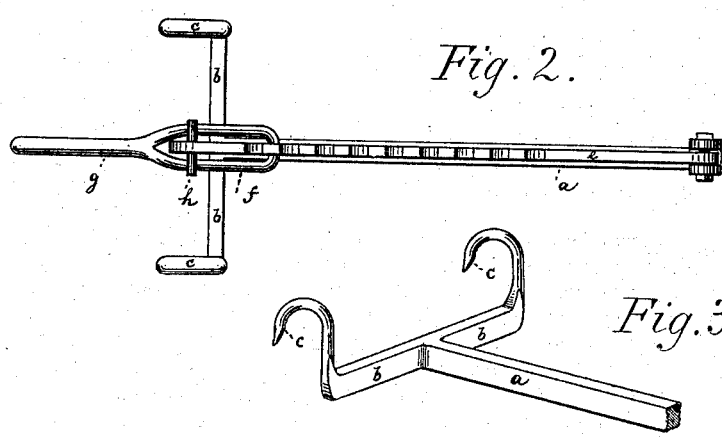
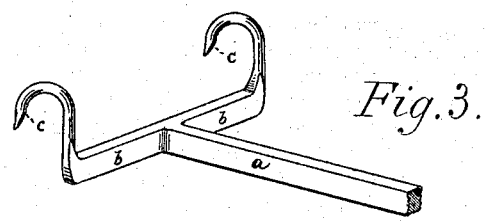
WITNESSES
W<sup>m</sup> A. Lowe
Rob't Roy
INVENTOR
Charles H. Rockwood
by Roeder & Briesen
attorneys

UNITED STATES PATENT OFFICE.

CHARLES H. ROCKWOOD, OF MARLBOROUGH, CONNECTICUT.

SCAFFOLD-BRACKET.

SPECIFICATION forming part of Letters Patent No. 316,573, dated April 28, 1885.

Application filed March 10, 1885. (No model.)

*To all whom it may concern:*

Be it known that I, CHARLES H. ROCKWOOD, of Marlborough, in the county of Middlesex and State of Connecticut, have invented a new and Improved Scaffold-Bracket, of which the following specification is a full, clear, and exact description.

This invention relates to a scaffold-bracket for supporting a foot-board. Two of these brackets are designed to be suspended at equal heights from two ladders placed against the same side of a building at a distance apart equal to or less than the length of the foot-board. The foot-board is then placed upon the brackets, and is thus supported against the side of the building to serve as a scaffold.

The invention consists, principally, in the combination of a bar carrying a hooked cross-bar with a rack and with a hook, all as hereinafter more fully described.

The invention also consists in the various elements of improvement hereinafter more fully pointed out.

In the accompanying drawings, Figure 1 is a side view of my improved scaffold-bracket. Fig. 2 is a top view of the same, and Fig. 3 is a perspective view of the pronged end of the lower bar.

The letter $a$ represents a metal bar connected to or made in one piece with a cross-bar, $b$, placed at right angles thereto. The cross-bar $b$ is provided at or near each end with hooks $c\ c$. At its rear end the bar $a$ is bent upward to form the upright $d$, and to this upright is pivotally connected a rack, $e$. The teeth of this rack are inclined backward, as shown, and are engaged by a looped shank, $f$, of a hook, $g$. The looped shank $f$ is curved upward and forward, as shown, and this shape is designed to prevent accidental displacement of the hook.

$h$ is a pin extending to the right and left of rack $e$, and forming a rest or stop against which the shank $f$ bears.

$i\ i$ are three (more or less) prongs projecting upward from bar $a$, and designed to bite the foot-board A and prevent it from slipping.

A ladder, B, is placed against the side of a building, and two of its rungs are engaged, respectively, by the hooks $c\ c$ and by the hook $g$.

The looped shank $f$ is introduced into that one of the slots of rack $e$ which will cause the bar $a$ to assume a horizontal position. Thus the bracket can always be adjusted to the inclination of the ladder.

I do not broadly claim to have invented a scaffold-bracket composed of two arms pivotally connected and adapted to be suspended from the rungs of a ladder, as such a bracket is described in Patent No. 170,391, granted to D. C. Place, November 23, 1875; but I do claim—

1. The combination of bar $a$ with cross-bar $b$, having hooks $c$, and with pivoted rack $e$ and hook $g$, substantially as specified.

2. The combination of bar $a$ with cross-bar $b$, having hooks $c$, and with upright $d$, rack $e$, pin $h$, and hook $g$, having looped shank $f$, substantially as specified.

3. The combination of bar $a$ with cross-bar $b$, hooks $c$, upright $d$, rack $e$, hook $g$, having upwardly and forwardly curved shank $f$, and with pin $h$ and prongs $i$, substantially as and for the purpose described.

C. H. ROCKWOOD.

Witnesses:
F. V. BRIESEN,
ROBT. ROY.